(12) United States Patent
Jha et al.

(10) Patent No.: US 11,260,989 B2
(45) Date of Patent: Mar. 1, 2022

(54) AIRCRAFT BEACON LIGHT, AIRCRAFT WING, AIRCRAFT BEACON LIGHT SYSTEM, AND METHOD OF SUPPLEMENTING AN AIRCRAFT BEACON LIGHT SYSTEM

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE); Marion Depta, Lippstadt (DE); Norbert Menne, Paderborn (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/659,739

(22) Filed: Oct. 22, 2019

(65) Prior Publication Data
US 2020/0122857 A1    Apr. 23, 2020

(30) Foreign Application Priority Data

Oct. 22, 2018 (EP) .................................. 18201803.6

(51) Int. Cl.
*B64D 47/06* (2006.01)
*F21S 43/20* (2018.01)
(Continued)

(52) U.S. Cl.
CPC .............. *B64D 47/06* (2013.01); *F21S 43/14* (2018.01); *F21S 43/20* (2018.01);
(Continued)

(58) Field of Classification Search
CPC .. B64C 23/072; B64D 2203/00; B64D 47/02; B64D 47/06; F21S 43/14; F21S 43/20;
(Continued)

(56) References Cited

U.S. PATENT DOCUMENTS 8,708,286 B2    4/2014  Sakurai et al.
2013/0341467 A1*  12/2013  Sakurai ..................... B64C 3/56
                                                        244/201

(Continued)

FOREIGN PATENT DOCUMENTS

EP         2676878 A2    12/2013
EP         2857309 A1     4/2015
(Continued)

OTHER PUBLICATIONS

Extended European Search Report for International Application No. 18201803.6 dated Mar. 4, 2019, 8 pages.
(Continued)

*Primary Examiner* — Nader Bolourchi
(74) *Attorney, Agent, or Firm* — Cantor Colburn LLP

(57) ABSTRACT

An aircraft beacon light for an aircraft wing with a foldable wing tip includes a housing, a lens cover, and at least one light source arranged between the housing and the lens cover, wherein the aircraft beacon light is configured to emit flashes of red light in operation, and wherein the housing and the lens cover are shaped to embed the aircraft beacon light into a hinge assembly coupling the foldable wing tip to a main wing portion of the aircraft wing.

17 Claims, 7 Drawing Sheets

(51) Int. Cl.
 *F21S 43/14* (2018.01)
 *F21Y 115/10* (2016.01)
 *F21W 107/30* (2018.01)
 *F21W 103/15* (2018.01)

(52) U.S. Cl.
 CPC ..... *B64D 2203/00* (2013.01); *F21W 2103/15* (2018.01); *F21W 2107/30* (2018.01); *F21Y 2115/10* (2016.08)

(58) Field of Classification Search
 CPC ........... F21W 2103/15; F21W 2107/30; F21Y 2115/10; Y02T 50/10
 See application file for complete search history.

(56) References Cited

U.S. PATENT DOCUMENTS

| | | | |
|---|---|---|---|
| 2015/0097087 A1* | 4/2015 | Sakurai | B64C 3/40 244/201 |
| 2018/0050821 A1* | 2/2018 | Schoen | B64D 47/06 |
| 2020/0094988 A1* | 3/2020 | Hessling-Von Heimendahl | F21S 43/14 |

FOREIGN PATENT DOCUMENTS

| | | |
|---|---|---|
| EP | 3284684 A1 | 2/2018 |
| EP | 3626630 A1 | 3/2020 |

OTHER PUBLICATIONS

EP Office Action for Application No. 18201803.6, dated Mar. 5, 2021, 5 pages.

\* cited by examiner

AIRCRAFT BEACON LIGHT, AIRCRAFT WING, AIRCRAFT BEACON LIGHT SYSTEM, AND METHOD OF SUPPLEMENTING AN AIRCRAFT BEACON LIGHT SYSTEM

FOREIGN PRIORITY

This application claims priority to European Patent Application No. 18201803.6 filed Oct. 22, 2018, the entire contents of which is incorporated herein by reference.

TECHNICAL FIELD

The present invention relates to exterior aircraft lighting. In particular, it relates to aircraft beacon light systems, i.e. to aircraft light systems that emit flashes of red light in order to indicate that the engines of the aircraft are running.

BACKGROUND

Almost all aircraft are equipped with exterior lighting systems. For example, large commercial aircraft have many different exterior lights. An exemplary group of exterior aircraft lights are lights for passive visibility, such as navigation lights, white strobe anti-collision lights, red flashing beacon lights and logo lights. Another exemplary group of exterior aircraft lights are headlights that allow the pilots to view the area in front of them, when they are seated in the cockpit, such as taxi lights, takeoff lights, landing lights, and runway turn-off lights. Yet another example of exterior aircraft lights are scan lights that allow the inspection of the aircraft structure in the dark, such as wing scan lights and engine scan lights.

Modern air planes are made in various different models. Existing exterior aircraft lights do not fit all of these models in all operating regimes in an entirely satisfactory manner. Accordingly, it would be beneficial to provide an exterior aircraft light that addresses shortcomings in the light output of particular kinds of aircraft.

SUMMARY

Exemplary embodiments of the invention include an aircraft beacon light for an aircraft wing with a foldable wing tip, the aircraft beacon light comprising a housing; a lens cover; and at least one light source arranged between the housing and the lens cover; wherein the aircraft beacon light is configured to emit flashes of red light in operation; and wherein the housing and the lens cover are shaped to embed the aircraft beacon light into a hinge assembly coupling the foldable wing tip to a main wing portion of the aircraft wing.

Exemplary embodiments of the invention allow for enhancing the beacon light output of aircraft that have wing structures with foldable wing tips. In particular, an aircraft beacon light that is shaped to be embedded into the hinge assembly between the foldable wing tip and the main wing portion may complete the beacon light output of the aircraft, when the folded up foldable wing tip shadows part of the beacon light output of other beacon lights. Further in particular, the foldable wing tip, when in the folded-up position, may block some of the light emitted by an aircraft beacon light arranged on an upper portion of the aircraft fuselage. The resulting gap in the beacon light output may be filled by the aircraft beacon light in accordance with exemplary embodiments of the invention. By embedding an aircraft beacon light into the hinge assembly, coupling the foldable wing tip and the main wing portion of an aircraft wing, the enhancing beacon light output may be conveniently provided when the foldable wing tip is in a folded-up position. The aircraft beacon light may be fully integrated into the aircraft wing, when the foldable wing tip is in a laterally extended position. In this way, the aircraft beacon light may not have any effect on the aerodynamics of the aircraft wing. The folding up of the foldable wing tip may expose the additional aircraft beacon light and may allow for the emission of the desired light output for filing the gaps in the beacon light output of the aircraft. Accordingly, an effective enhancing of the beacon light output may be achieved, when the foldable wing tip is in the folded up position, without any detrimental effect on the aerodynamics of the aircraft wing, when the foldable wing tip is in the laterally extended position.

Exemplary embodiments of the invention allow for the provision of an aircraft beacon light that contributes to facilitating a comprehensive beacon light output, both when the foldable wing tip of the aircraft is in a folded up position and when the foldable wing tip is in a laterally extended position. In this way, it may be possible to fold up the wing tips of an aircraft model having foldable wing tips during taxiing on an airport, without compromising the signalling safety provided by the beacon light system. In addition to folding up the wing tips in an aircraft's parking position, which may be done for saving space on airports, the wing tips of an aircraft equipped with aircraft beacon lights in accordance with exemplary embodiments of the invention may be folded up during taxiing without compromising safety. In this way, the space requirements for taxiing may be reduced, while still emitting reliable signalling in the form of a comprehensive beacon light output.

The at least one light source may be at least one LED. In this way, the light output may be provided in a particularly power-efficient manner. Also, the maintenance requirements for the aircraft beacon light may be kept low. The at least one LED may be at least one colored LED, as will be explained below.

The housing and the lens cover are shaped to embed the aircraft beacon light into a hinge assembly of an aircraft wing, coupling the foldable wing tip and the main wing portion. The hinge assembly may allow for a rotation of the foldable wing tip with respect to the main wing portion. In particular, the hinge assembly may comprise a first hinge part, which is attached to or which is an integral part of the main wing portion, and a second hinge part, which is attached to or which is an integral part of the foldable wing tip. For example, the first hinge part may comprise a plurality of first teeth, and the second hinge part may comprise a plurality of second teeth. The first and second teeth may be in engagement along a rotation axis. For example, a rotation rod or rotation axle may extend through the first and second teeth. The housing and the lens cover may be shaped to embed the aircraft beacon light into any suitable portion of the hinge assembly of the aircraft wing. For example, the housing and the lens cover may be shaped to embed the aircraft beacon light into one of the plurality of first teeth.

The housing and the lens cover are shaped to embed the aircraft beacon light into a hinge assembly of an aircraft wing, coupling the foldable wing tip and the main wing portion. In other words, the housing and the lens cover are shaped to be integrated into the hinge assembly of the aircraft wing. In yet other words, the aircraft beacon light has a size, weight, and space envelope that allows for embedding it into the hinge assembly. The space envelope, as defined by the housing and the lens cover, may fit into a corresponding recess in the hinge assembly.

The aircraft beacon light is configured to emit flashes of red light in operation. This wording relates to the perception of the light output by the observer. For example, a person on the airfield, when in the output range of the aircraft beacon light, sees red light flashes emitted by the aircraft beacon light. The term red light encompasses any kind of reddish shade of light. In a particular embodiment, the aircraft beacon light may be configured to emit flashes of aviation red light in operation. The term aviation red refers to a range of shades of red light, particularly well-suited to aircraft operations. The color range of aviation red may for example be as defined in section 25.1397 of the Federal Aviation Regulations (FAR).

According to a further embodiment, the housing and the lens cover are shaped to embed the aircraft beacon light into a lateral end of the main wing portion of the aircraft wing. In this way, the aircraft beacon light may be very well-positioned for providing an additional beacon light output in a lateral direction from the aircraft. In particular, the general orientation of the aircraft beacon light may correspond well to the shadow cast by the foldable wing tip, when in a folded up position. A desired beacon light output, filling the gap created by said shadow, may be achieved with low complexity, such as a low number of optical elements, and high efficiency.

According to a further embodiment, the lens cover has a substantially flat lens cover portion configured to form part of a side face of the main wing portion of the aircraft wing, when the foldable wing tip is in a folded up position. In this way, the lens cover may be well-adapted to forming an engagement face of the main wing portion in the hinge assembly. Also, said flat lens cover portion may be covered by the foldable wing tip, when in the laterally extended position. In this way, an inadvertent emission of beacon light output may be prevented, when the foldable wing tip is in the laterally extended position. Also, forming part of the side face of the main wing portion allows for a good alignment between the general orientation of the aircraft beacon light and the shadow cast by the foldable wing tip, when in a folded up position.

According to a further embodiment, the lens cover has a lens cover portion configured to form part of an underside of the main wing portion. In a particular embodiment, the aircraft beacon light may be configured to emit part of its beacon light output through the lens cover portion that forms part of the underside of the main wing portion. In this way, said part of the beacon light output may be emitted into the aircraft environment, also when the foldable wing tip is in the laterally extended position.

According to a further embodiment, the at least one light source is at least one red light source, in particular at least one red LED. In other words, the light source or light sources inherently emit light of red color. In this way, the lens cover and the optical system, if present, can pass on the red light in an unaltered manner, with flashes of red light being output by the aircraft beacon light.

According to a further embodiment, the lens cover is or comprises a red light filter. In other words, the lens cover is or comprises a filter adapted to filter out all light except for red light. In this way, light sources emitting a combination of colors, such as white LEDs or other white light sources, can be conveniently used for the aircraft beacon light. The lens cover itself may be the red light filter. It is also possible that the lens cover comprises a red light filter, which may be arranged on the inside thereof.

Exemplary embodiments of the invention further include an aircraft wing, comprising a main wing portion; a foldable wing tip; a hinge assembly coupling the main wing portion and the foldable wing tip; and an aircraft beacon light, as described in any of the embodiments above, embedded into the hinge assembly. The additional features, modifications, and beneficial effects, discussed above with respect to the aircraft beacon light in accordance with exemplary embodiments of the invention, apply to the aircraft wing in an analogous manner.

According to a further embodiment, the hinge assembly is configured to allow for a motion of the foldable wing tip between a laterally extended position and a folded up position.

According to a further embodiment, the foldable wing tip exposes at least part of the lens cover of the aircraft beacon light, when in the folded up position. The foldable wing tip may block light emitted through said part of the lens cover, when in the laterally extended position. The foldable wing tip may expose substantially all or all of the lens cover of the aircraft beacon light, when in the folded up position, and may block light emitted through substantially all or all of the lens cover of the aircraft beacon light, when in the laterally extended position. In this way, the aircraft beacon light may have an un-impeded light output path, when the foldable wing tip is in the folded up position. Also, the aircraft beacon light may be arranged at a position that is completely blocked off from the outside environment, when the foldable wing tip is in the laterally extended position. In this way, a high degree of freedom for positioning the aircraft beacon light is provided. A light output path from the aircraft beacon light during flight operation, i.e. when the foldable wing tip is in the laterally extended position, is not required.

According to a further embodiment, the hinge assembly comprises a plurality of first teeth, which are an integral part of the main wing portion, and a plurality of second teeth, which are an integral part of the foldable wing tip, and the aircraft beacon light is arranged in one of the plurality of first teeth. The plurality of first teeth may be in engagement with the plurality of second teeth. A rotation axis may run through the plurality of first teeth and the plurality of second teeth. A rotation axle or rod may run through the plurality of first teeth and the plurality of second teeth, enabling their relative rotation, while providing attachment therebetween.

According to a further embodiment, the aircraft beacon light is configured to emit the flashes of red light over a horizontal opening angle of between 5° and 30°, in particular over a horizontal opening angle of between 5° and 20°, further in particular over a horizontal opening angle of between 5° and 15°. In this way, the horizontal opening angle may be similar to the horizontal blocking angle of the foldable wing tip. The term horizontal opening angle refers to the opening angle of the light output in the horizontal cross-sectional plane through the aircraft beacon light. The term horizontal may refer to the orientation of the aircraft beacon light, when installed in the aircraft wing of the aircraft. The horizontal opening angle may be measured as that angle where the aircraft beacon light fulfils the illumination requirements as laid out in Federal Aviation Regulations (FAR) section 25.1401.

According to a further embodiment, the aircraft beacon light is configured to emit the flashes of red light over a vertical opening angle of between 5° and 180°, in particular over a vertical opening angle of between 5° and 150°, further in particular over a vertical opening angle of between 5° and 30°. For the upper end of the broader value ranges, the vertical opening angle may be such that a full vertical slice of the illumination requirements, as laid out in Federal Aviation Regulations (FAR) section 25.1401, may be fulfilled. For the most narrow value ranges, the vertical opening angle may be similar to the vertical blocking angle of the foldable wing tip. The term vertical opening angle refers to the opening angle of the light output in a vertical cross-sectional plane through the aircraft beacon light. The term vertical may refer to the orientation of the aircraft beacon light, when installed in the aircraft wing of the aircraft. The vertical cross-sectional plane may run through the center of the horizontal opening angle or may be any other vertical cross-sectional plane within the horizontal opening angle, as discussed above. The vertical opening angle may be measured as that angle where the aircraft beacon light fulfils the illumination requirements as laid out in Federal Aviation Regulations (FAR) section 25.1401.

According to a further embodiment, the aircraft beacon light is configured to emit the flashes of red light over a solid angle containing a projection of the foldable wing tip, when in the folded up position. In particular, the projection may be made from an upper portion of the aircraft fuselage, for which the aircraft wing is built and/or to which the aircraft wing is attached in operation. Further in particular, the projection may be made from the position of an upper fuselage-mounted aircraft beacon light. In this way, it may be ensured that the aircraft beacon light fills the entire gap in the beacon light output, created by the shadow of the foldable wing tip, when in the folded up position.

According to a further embodiment, the aircraft beacon light is configured to emit the flashes of red light over a solid angle containing a projection of an engine, arranged on the aircraft wing. In particular, the projection may be made from a lower portion of the aircraft fuselage, for which the aircraft wing is built and/or to which the aircraft wing is attached in operation. Further in particular, the projection may be made from the position of a lower fuselage-mounted aircraft beacon light. In this way, it may be ensured that the aircraft beacon light fills the entire gap in the beacon light output, created by the shadow of the engine. According to a further embodiment, the aircraft beacon light may be configured to emit at least part of the light output that contains the projection of the engine through a portion of the lens cover on the underside of the aircraft wing.

Exemplary embodiments of the invention further include an aircraft, comprising a fuselage, a right aircraft wing, as described in any of the embodiments above, and a left aircraft wing, as described in any of the embodiments above. The right aircraft wing and the left aircraft wing are attached to the fuselage. The aircraft may further comprise an upper fuselage-mounted beacon light configured to emit flashes of red light in operation and a lower fuselage-mounted beacon light configured to emit flashes of red light in operation. The additional features, modifications, and beneficial effects, discussed above with respect to the aircraft beacon light in accordance with exemplary embodiments of the invention and the aircraft wing in accordance with exemplary embodiments of the invention, apply to the aircraft in an analogous manner.

According to a further embodiment, the aircraft is an air plane.

Exemplary embodiments of the invention further include an aircraft beacon light system, comprising an upper fuselage-mounted beacon light configured to emit flashes of red light in operation; a lower fuselage-mounted beacon light configured to emit flashes of red light in operation; a right wing aircraft beacon light, as described in any of the embodiments above; and a left wing aircraft beacon light, as described in any of the embodiments above. The additional features, modifications, and beneficial effects, discussed above with respect to the aircraft beacon light in accordance with exemplary embodiments of the invention, apply to the aircraft beacon light system in an analogous manner. In particular, the right and left aircraft beacon lights may be well-suited to fill gaps in the beacon light output stemming from the blocking of light from the upper and lower fuselage-mounted beacon lights by the right and left foldable wing tips, when in the folded up position. The right and left aircraft beacon lights may further be well-suited to fill gaps in the beacon light output stemming from the blocking of light from the upper and lower fuselage-mounted beacon lights by the right and left engines, mounted to the right and left aircraft wings.

According to a further embodiment, the upper fuselage-mounted beacon light, the lower fuselage-mounted beacon light, the right wing tip beacon light and the left wing tip beacon light are synchronized with respect to emitting the flashes of red light. In particular, the upper fuselage-mounted beacon light, the lower fuselage-mounted beacon light, the right wing aircraft beacon light and the left wing aircraft beacon light may be synchronized, such that the flash frequency is below 180 flashes per minute in overlap areas between the light outputs of the individual beacon lights. Synchronization may allow for a reliable signalling of running engines of the aircraft, while preventing a sensory overload on the part of the observers of the aircraft.

Exemplary embodiments of the invention further include a method of supplementing an aircraft beacon light system having an upper fuselage-mounted beacon light and a lower fuselage-mounted beacon light, the method comprising emitting flashes of red light from a hinge assembly of an aircraft wing, the hinge assembly coupling a foldable wing tip and a main wing portion of the aircraft wing, when the foldable wing tip of the aircraft wing is in a folded up position. The additional features, modifications, and beneficial effects, discussed above with respect to the aircraft beacon light in accordance with exemplary embodiments of the invention, with respect to the aircraft wing in accordance with exemplary embodiments of the invention, with respect to the aircraft in accordance with exemplary embodiments of the invention, and with respect to the aircraft beacon light system in accordance with exemplary embodiments of the invention, apply to the method of supplementing an aircraft beacon light system in an analogous manner.

According to a further embodiment, said emitting flashes of red light comprises emitting flashes of red light over a solid angle containing a projection of the foldable wing tip, when in the folded up position, as projected from the position of the upper fuselage-mounted beacon light.

According to a further embodiment, said emitting flashes of red light comprises emitting flashes of red light over a solid angle containing a projection of an engine, arranged on the aircraft wing, as projected from the position of the lower fuselage-mounted beacon light.

BRIEF DESCRIPTION OF THE DRAWINGS

Further exemplary embodiments of the invention are described with respect to the accompanying drawings, wherein.

DETAILED DESCRIPTION

Figure 1:
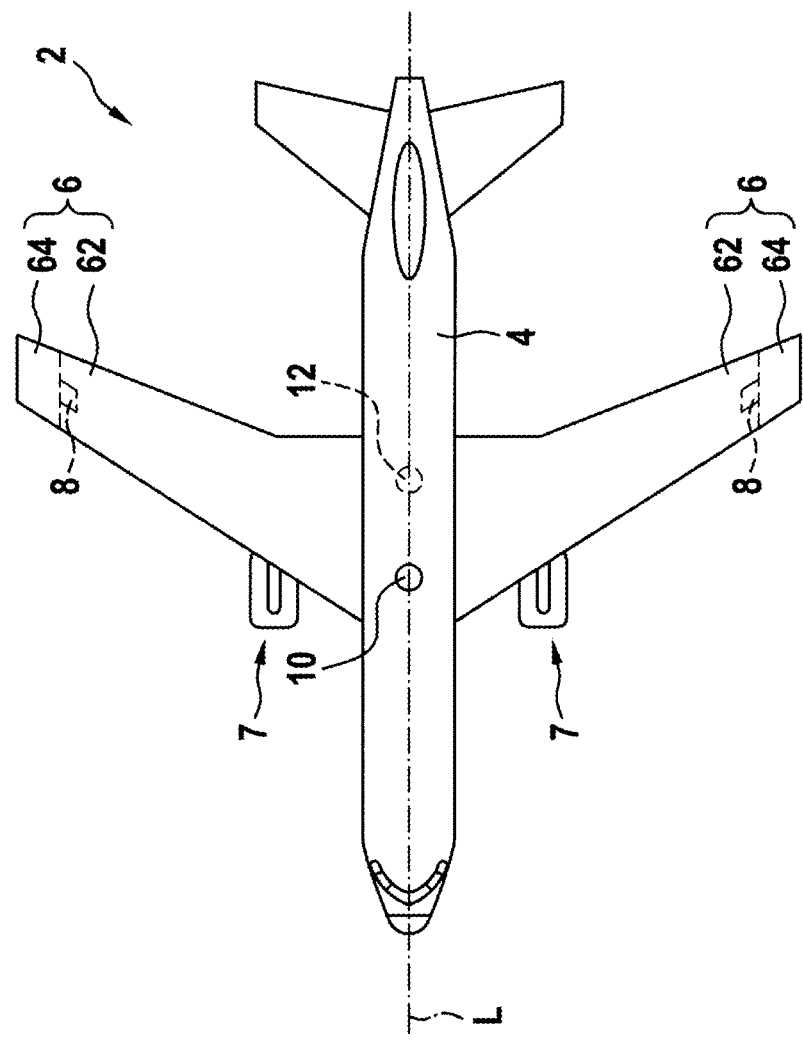
FIG. 1 shows a schematic top view of an aircraft in accordance with an exemplary embodiment of the invention, the aircraft being equipped with two aircraft beacon lights, arranged in the wings of the aircraft, in accordance with exemplary embodiments of the invention.

FIG. 1 shows a schematic top view of an aircraft 2, in particular an air plane 2, comprising a fuselage 4 and two wings 6 extending laterally from the fuselage 4. An engine 7 is mounted to each of the wings 6, respectively. The air plane 2 is substantially symmetric with respect to its longitudinal axis L. Each of the wings 6 has a main wing portion 62 and a foldable wing tip 64. In particular, the right wing 6 has a right main wing portion 62 and a right foldable wing tip 64, and the left wing 6 has a left main wing portion 62 and a left foldable wing tip 64. Respective rotation axes between the main wing portions 62 and the foldable wing tips 64 are indicated with dashed lines in FIG. 1.

The aircraft 2 is provided with an upper fuselage-mounted beacon light 10 and a lower fuselage-mounted beacon light 12. Both the upper fuselage-mounted beacon light 10 and the lower fuselage-mounted beacon light 12 are configured to emit flashes of red light in operation. The upper fuselage-mounted beacon light 10 has a 360° beacon light output in the horizontal plane and fulfils the FAR requirements for beacon lights for the upper hemisphere. The lower fuselage-mounted beacon light 12 has a 360° beacon light output in the horizontal plane and fulfils the FAR requirements for beacon lights for the lower hemisphere. The lower fuselage-mounted beacon light 12 is depicted in phantom in FIG. 1, as it is blocked from view by the fuselage 4 of the aircraft 2 in the viewing direction of FIG. 1.

The aircraft 2 is further provided with two aircraft beacon lights 8 in accordance with exemplary embodiments of the invention. One of the aircraft beacon lights 8 is provided in the right wing, while the other one of the aircraft beacon lights 8 is provided in the left wing. The aircraft beacon lights 8 are also shown in phantom, because they are blocked from view by the wing structures of the right and left wings 6 of the aircraft 2 in the viewing direction of FIG. 1. The aircraft beacon lights 8 are arranged in the hinge assemblies, coupling the respective foldable wing tip 64 and the respective main wing portion 62 of the aircraft wing in question. Accordingly, the aircraft beacon lights 8 are depicted at the rotation axes between the main wing portions 62 and the foldable wing tips 64 in the schematic illustration of FIG. 1. The aircraft beacon lights 8 are configured to supplement the beacon light output, as provided by the upper and lower fuselage-mounted beacon lights 10, 12, when the foldable wing tips 64 are in a folded up position. The upper and lower fuselage-mounted beacon lights 10, 12 and the aircraft beacon lights 8 in the right and left wings of the aircraft 2 form an aircraft beacon light system in accordance with an exemplary embodiment of the invention.

Figure 2:
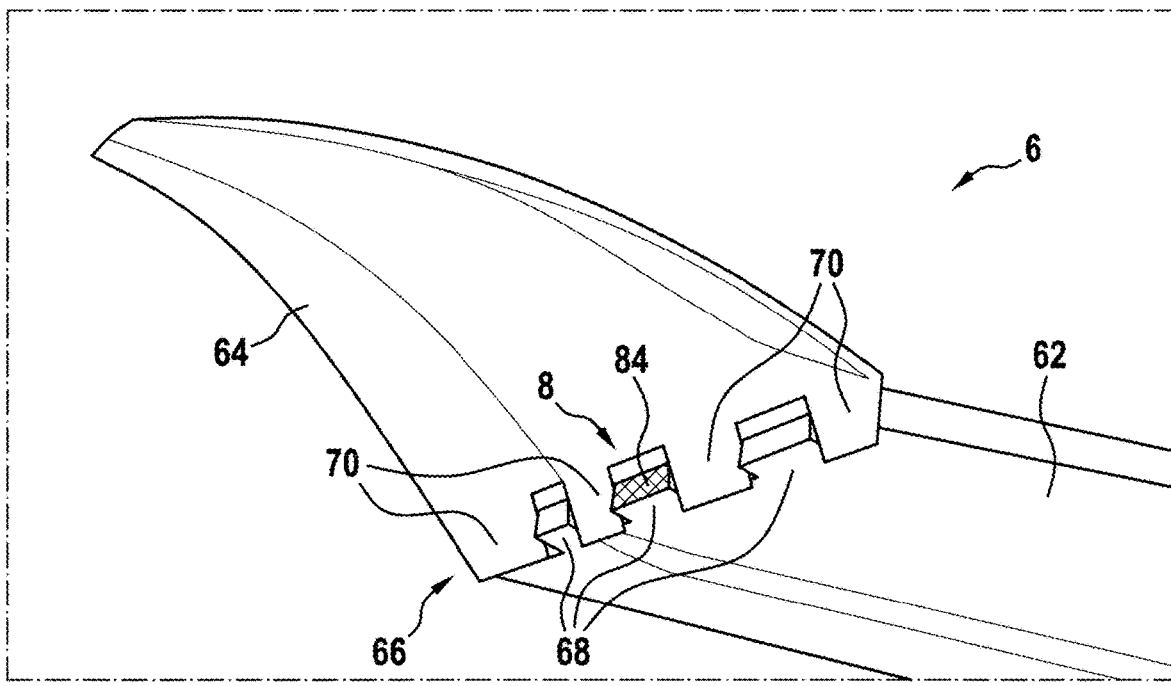
FIG. 2 shows a perspective view of a foldable wing tip and a part of a main wing portion of an aircraft wing in accordance with an exemplary embodiment of the invention, the aircraft wing being equipped with an aircraft beacon light in accordance with an exemplary embodiment of the invention.

FIG. 2 shows a perspective view of a right foldable wing tip 64 and a part of a right main wing portion 62 of an aircraft wing 6 in accordance with an exemplary embodiment of the invention. A hinge assembly 66 is provided for coupling the main wing portion 62 and the foldable wing tip 64. The hinge assembly 66 allows for moving the foldable wing tip 64 between a folded up position and a laterally extended position with respect to the main wing portion 62. FIG. 2 shows an intermediate position during the transition from the folded up position of the foldable wing tip 64 to the laterally extended position of the foldable wing tip 64. By folding up the foldable wing tip 64 on the ground, the wing span of the aircraft may be reduced, making the taxiing on an airport easier and saving parking space at the gate or on the airfield.

In the depicted embodiment of FIG. 2, the hinge assembly 66 comprises a plurality of first teeth 68 on the side of the main wing portion 62 and a plurality of second teeth 70 on the side of the foldable wing tip 64. The plurality of first teeth 68 and the plurality of second teeth 70 mesh. They are in engagement with each other. In particular, the plurality of first teeth 68 and the plurality of second teeth 70 are engaged with each other via a rotation axle or rotation rod or similar structure. The foldable wing tip 64 is thus rotatable with respect to the main wing portion 62. In the exemplary embodiment of FIG. 2, the plurality of first teeth 68 are an integral part of the main wing portion 62 and the plurality of second teeth 70 are an integral part of the foldable wing tip 64.

The wing 6 is equipped with an aircraft beacon light 8 in accordance with an exemplary embodiment of the invention. In particular, the hinge assembly 66 of the wing 6 is provided with the aircraft beacon light 8. Further in particular, the aircraft beacon light 8 is arranged in one of the plurality of first teeth 8. In this way, the aircraft beacon light 8 is arranged in the portion of the hinge assembly 66 that is in the main wing portion 62. The aircraft beacon light 8 is embedded into the hinge assembly 66.

The aircraft beacon light 8 has a housing and a lens cover 84, as will be described below with respect to FIG. 4. The housing is integrated into the hinge assembly and is therefore blocked from view in the viewing direction of FIG. 2. However, lens cover 84 of the aircraft beacon light 8 is visible in FIG. 2. The lens cover is arranged in the lateral end of the main wing portion 62. In particular, the lens cover 84 forms the side face of the one of the plurality of first teeth 68, into which the aircraft beacon light 8 is embedded. In this way, the lens cover 84 forms part of the side face of the main wing portion 62. While the lens cover 84 is covered by the foldable wing tip 64, when the foldable wing tip 64 is in the laterally extended position, the foldable wing tip 64 exposes the lens cover 84, when being moved to the folded up position. In the exemplary embodiment of FIG. 2, the lens cover 84 is a substantially flat element, forming the substantially flat side face of said one of the plurality of first teeth 68.

It is pointed out that the wing 6 may have multiple aircraft beacon lights 8 in accordance with exemplary embodiments of the invention. For example, two or more aircraft beacon lights may be arranged in two or more of the plurality of first teeth 68. It is further pointed out that the hinge assembly may by implemented differently. The meshing teeth are merely an exemplary embodiment. The aircraft beacon light in accordance with exemplary embodiments of the invention may be arranged at any position in the hinge assembly that allows for light emission to a lateral outside of the aircraft, when the foldable wing tip 64 is in a folded up position.

Figure 3:
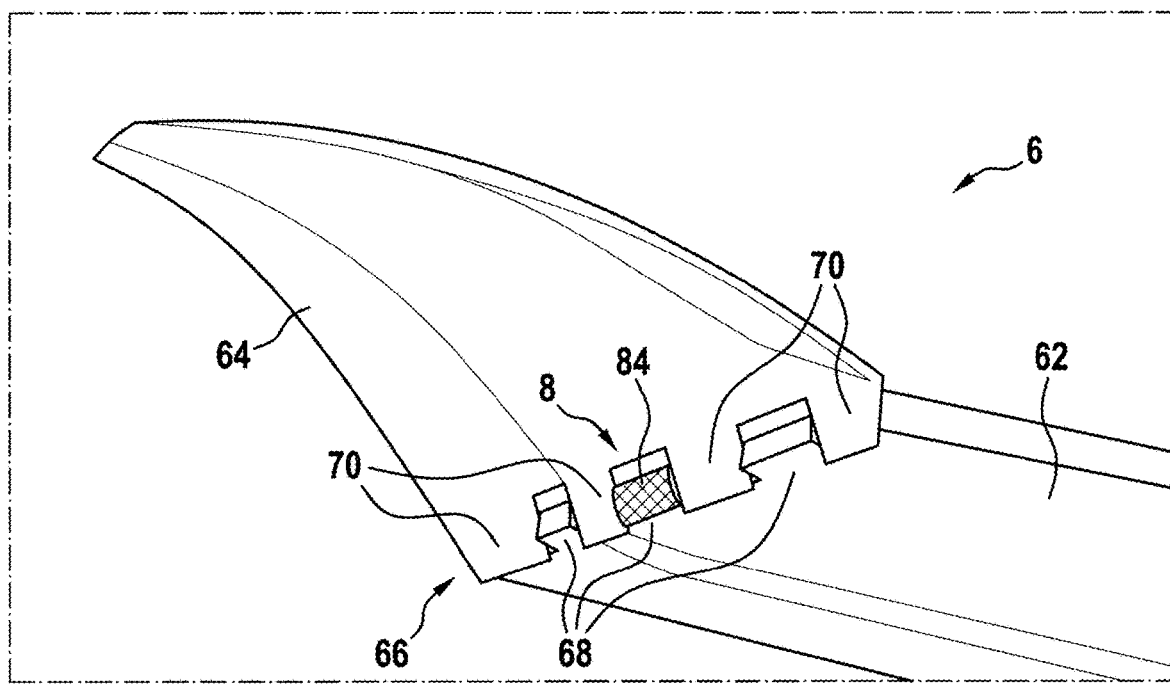
FIG. 3 shows a perspective view of a foldable wing tip and a part of a main wing portion of an aircraft wing in accordance with an exemplary embodiment of the invention, the aircraft wing being equipped with an aircraft beacon light in accordance with another exemplary embodiment of the invention.

FIG. 3 shows a perspective view of a right foldable wing tip 64 and a part of a right main wing portion 62 of an aircraft wing 6 in accordance with an exemplary embodiment of the invention. The wing 6 is very similar to the wing 6 of FIG. 2, with like elements being denoted with like reference numerals. Reference is made to the description thereof above. The aircraft beacon light 8 of FIG. 3 differs from the aircraft beacon light 8 of FIG. 2 in that the lens cover 84 is more extensive. In particular, the lens cover 84 of the aircraft beacon light 8 of FIG. 3 forms the side face of said one of the plurality of first teeth 68 and part of an underside of said one of the plurality of first teeth 68. In this way, the lens cover 84 has a larger area, which may be used for light emission. Also, part of the light emission may take place through the part of the lens cover 84 that is on the underside of the main wing portion 62. This may allow for an easier inspection of the aircraft beacon light 8.

Figure 4:
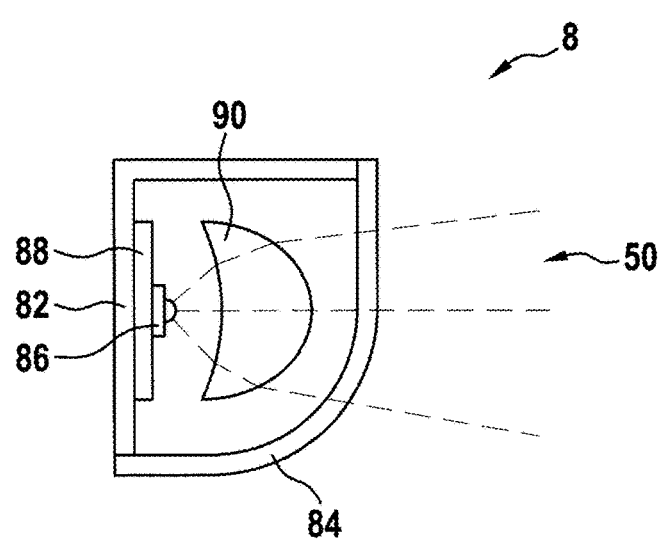
FIG. 4 shows a schematic cross-sectional view through an aircraft beacon light in accordance with an exemplary embodiment of the invention.

FIG. 4 shows a schematic cross-sectional view through an aircraft beacon light 8 in accordance with an exemplary embodiment of the invention. The aircraft beacon light 8 may be used as the aircraft beacon light 8 of the aircraft wing 6 of FIG. 3. The schematic cross-sectional view of FIG. 4 is a vertical cross-sectional view through the aircraft beacon light 8, when assembled in an aircraft.

The aircraft beacon light 8 has a housing 82, a lens cover 84, and a light source 86. In the exemplary embodiment of FIG. 4, the light source 86 is an LED, which is arranged on a printed circuit board 88. In particular, the light source 86 is a red LED. The aircraft beacon light 8 is configured to emit flashes of red light in operation. In particular, the light source 86 may be provided with electric power in a pulsed manner, in order to emit the flashes of red light. The aircraft beacon light 8 may have a control unit that provides pulses of electric current to the light source 86, in order to generate the flashes of red light. The lens cover 84 may be a transparent plastics cover. In particular, the lens cover 84 may pass light of all wavelengths therethrough. It is also possible that the light source 86 emits white light and that the lens cover 84 is a red light filter.

In the exemplary embodiment of FIG. 4, the aircraft beacon light 8 further comprises a collimating lens 90. The collimating lens 90 forms the optical system of the aircraft beacon light 8. It shapes the light output of the aircraft beacon light 8. It is also possible that the aircraft beacon light 8 has additional or other optical elements. In particular, the aircraft beacon light 8 may have one or more lenses and/or one or more reflectors and/or one or more shutters. In other words, the optical system of the aircraft beacon light 8 may be comprised of various optical elements. The beacon light output of the aircraft beacon light 8 is illustrated by three exemplary light rays in FIG. 4 and is generally denoted with reference numeral 50.

Figure 5:
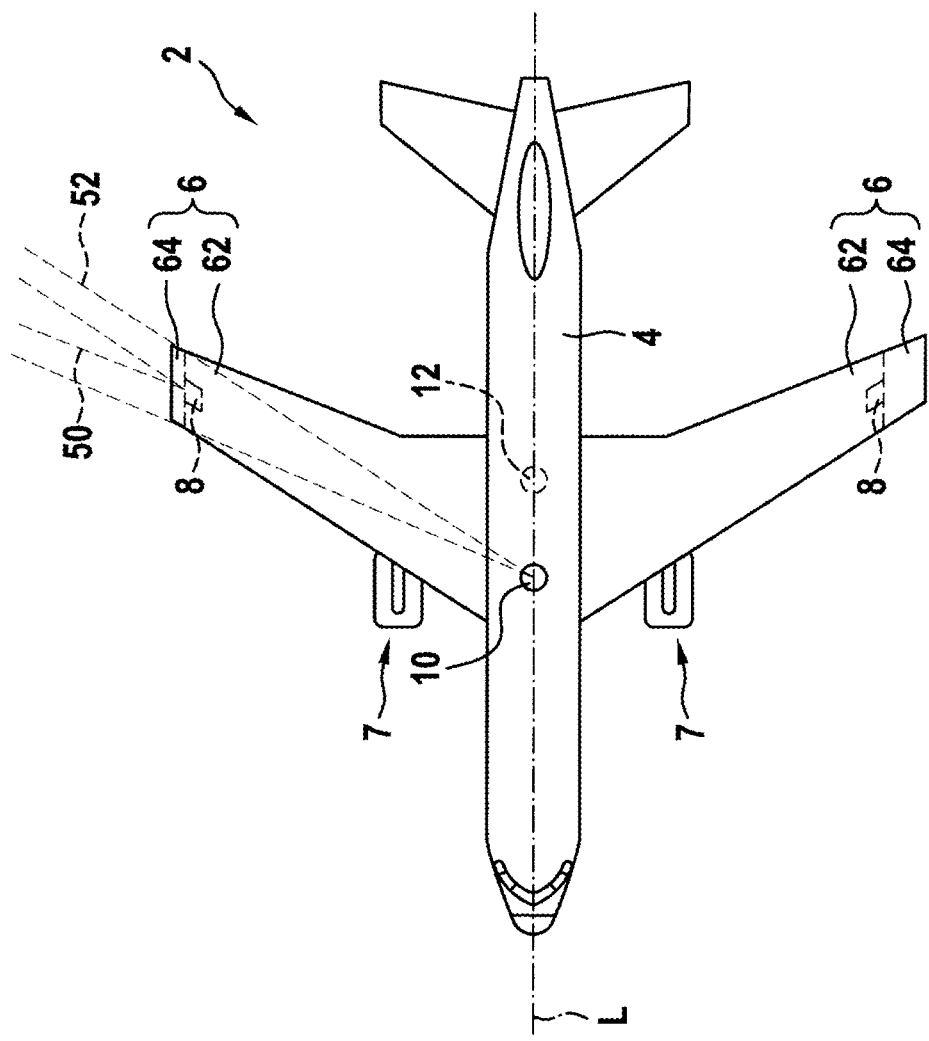
FIG. 5 illustrates a beacon light output, as emitted by an aircraft beacon light in accordance with an exemplary embodiment of the invention, in the context of the schematic top view of the aircraft of FIG. 1.

FIG. 5 illustrates a beacon light output 50, as emitted by an aircraft beacon light 8 in accordance with an exemplary embodiment of the invention, in the context of the schematic top view of the aircraft 2 of FIG. 1. In FIG. 5, the foldable wing tip 64 of the right wing 6 of the aircraft 2 is shown in a folded up position. Being in the folded up position, the foldable wing tip 64 is shown as a thin structure, corresponding to the thickness of the foldable wing tip 64. Being in the folded up position, the foldable wing tip 64 exposes the side face of the main wing portion 62, such that the aircraft beacon light 8 may emit its beacon light output into the aircraft environment. The beacon light output consists of a sequence of flashes of red light.

In the schematic top view of FIG. 5, the beacon light output 50 is illustrated as an illumination cone, leaving the aircraft beacon light 8 laterally outwards in the aircraft frame of reference. In other words, the aircraft beacon light 8 emits a beacon light output 50 laterally outwards. FIG. 5 further depicts a projection 52 of the foldable wing tip 64, when in the folded up position. The projection 52 is illustrated as a cone, leaving the upper fuselage-mounted beacon light 10 and enveloping the longitudinal extension of the foldable wing tip 64 in the aircraft frame of reference. In the depicted horizontal drawing plane, the projection 52 is a sector having an opening angle of about 10°.

The beacon light output 50 is a wider cone than the projection 52 of the foldable wing tip 64. The aircraft beacon light 8 is thus able to fill the entire gap in the beacon light output of the upper fuselage-mounted beacon light 10 that is created due to the light blocking by the folded up foldable wing tip 64. In the depicted horizontal drawing plane, the beacon light output 50 is a sector having an opening angle of about 15°. As can be seen from the angles between the projection 52 and the beacon light output 50, the beacon light output fills the entire gap at some lateral distance from the foldable wing tip 64. In this way, the beacon light output of the entire beacon light system is perceived as undisturbed by the folded up foldable wing tip 64 at some distance from the foldable wing tip 64.

It is understood that the considerations laid out above with respect to the right wing 6 apply to the left wing 6 in an analogous manner. For ease of illustration, the projection 52 and the beacon light output 50 are depicted for the right wing 6 only.

The upper fuselage-mounted bacon light, the lower fuselage-mounted beacon light, the aircraft beacon light 8 in the right wing 6, also referred to as right wing aircraft beacon light, and the aircraft beacon light 8 in the left wing 6, also referred to as left wing aircraft beacon light, are synchronized. In other words, the timing of the flashes of the lights may be adapted to each other. In a particular embodiment, the lights may be adapted to emit the flashes of red light at substantially the same points in time and for substantially the same durations.

Figure 6:
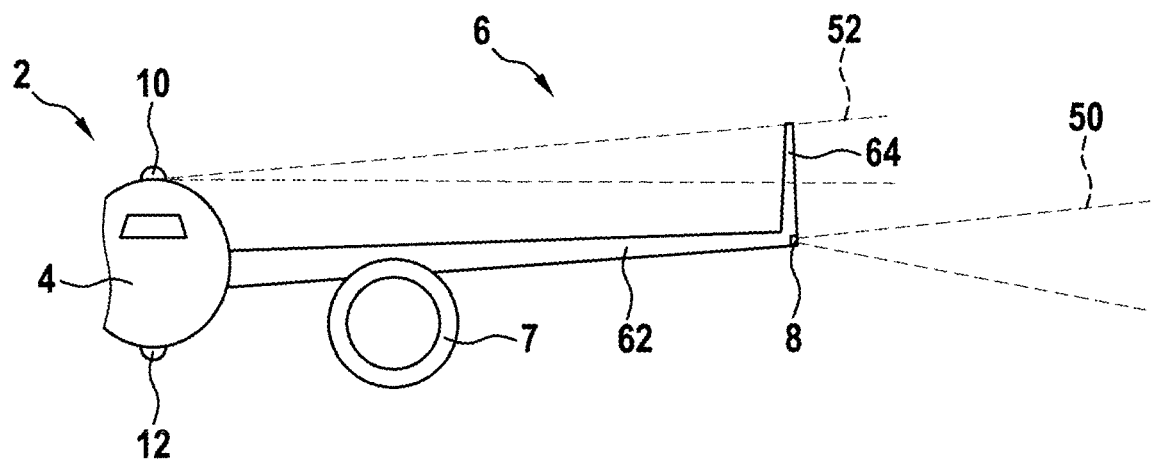
FIG. 6 illustrates a beacon light output, as emitted by an aircraft beacon light in accordance with an exemplary embodiment of the invention, in the context of a schematic front view of an aircraft in accordance with an exemplary embodiment of the invention.

FIG. 6 illustrates a beacon light output 50, as emitted by an aircraft beacon light 8 in accordance with an exemplary embodiment of the invention, in the context of a schematic front view of an aircraft 2 in accordance with an exemplary embodiment of the invention. The aircraft 2 may be the aircraft 2 of FIGS. 1 and 5. Like elements are denoted with like reference numerals, and reference is made to the description thereof above. In FIG. 6, only the left wing 6 is shown. It is understood that the aircraft 2 has a substantially mirror-symmetric right wing.

In the schematic front view of FIG. 6, the beacon light output 50 is illustrated as an illumination cone, leaving the aircraft beacon light 8 laterally outwards in the aircraft frame of reference, i.e. to the right in the drawing plane of FIG. 6. As is apparent from looking at FIGS. 5 and 6, the beacon light output 50 is a three-dimensional illumination cone, having both a horizontal opening angle and a vertical opening angle. FIG. 6 further depicts the projection 52 of the foldable wing tip 64, when in the folded up position, as seen from the front of the aircraft 2. The projection 52 is illustrated as a cone, leaving the upper fuselage-mounted beacon light 10. The lower line of the projection 52 corresponds to the lowest light emission direction of the upper fuselage-mounted beacon light 10. The upper line of the projection runs along the upper end of the foldable wing tip 64. The projection 52 corresponds to the shadow created by the folded up foldable wing tip 64. In the depicted vertical drawing plane, the projection 52 is a sector having an opening angle of between 5° and 10°.

The beacon light output 50 is a wider cone than the projection 52 of the foldable wing tip 64. The aircraft beacon light 8 is thus able to fill the entire gap in the beacon light output of the upper fuselage-mounted beacon light 10 that is created due to the light blocking by the folded up foldable wing tip 64. In the depicted vertical drawing plane, the beacon light output 50 is a sector having an opening angle of about 20°. As can be seen from the angles between the projection 52 and the beacon light output 50, the beacon light output fills the entire gap at some lateral distance from the foldable wing tip 64. In this way, the beacon light output of the entire beacon light system is perceived as undisturbed by the folded up foldable wing tip 64 at some distance from the foldable wing tip 64.

Figure 7:
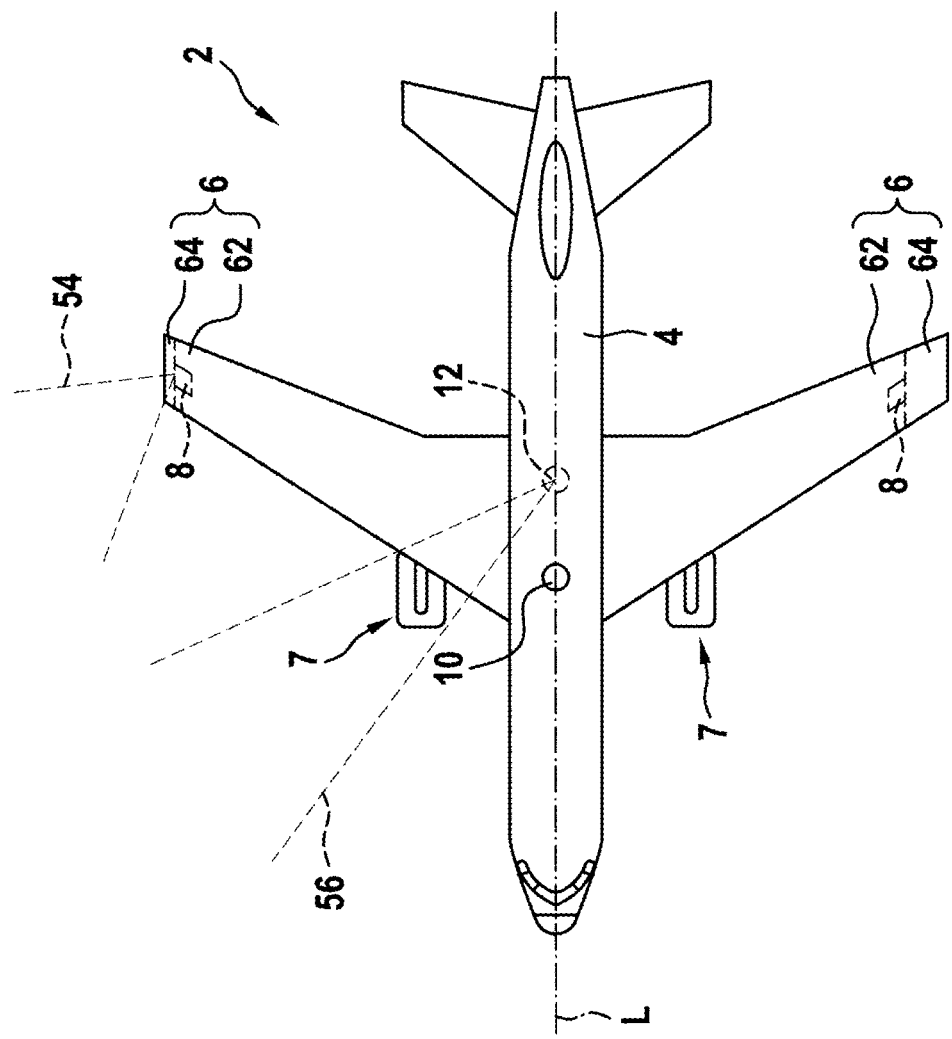
FIG. 7 illustrates a beacon light output, as emitted by an aircraft beacon light in accordance with another exemplary embodiment of the invention, in the context of the schematic top view of the aircraft of FIG. 1.

FIG. 7 illustrates a beacon light output 54, as emitted by an aircraft beacon light 8 in accordance with another exemplary embodiment of the invention, in the context of the schematic top view of the aircraft 2 of FIG. 1. In FIG. 7, the foldable wing tip 64 of the right wing 6 of the aircraft 2 is shown in a folded up position. Being in the folded up position, the foldable wing tip 64 is shown as a thin structure, corresponding to the thickness of the foldable wing tip 64. The illustration of FIG. 7 is thus similar to the illustration of FIG. 5. Being in the folded up position, the foldable wing tip 64 exposes the side face of the main wing portion 62.

In the exemplary embodiment of FIG. 7, the aircraft beacon light 8 has a lens cover that is partly arranged on the side face of the main wing portion 62 and partly arranged on the underside of the main wing portion 62. The aircraft beacon light 8 of FIG. 7 may be the aircraft beacon light 8, as described with respect to FIGS. 3 and 4. This will be described in more detail with respect to FIGS. 8 and 9 below. The aircraft beacon light 8 of FIG. 7 is configured to emit part of its beacon light output via the part of the lens cover on the side face of the main wing portion 62 and part of its beacon light output via the part of the lens cover on the underside of the main wing portion 62. The beacon light output consists of a sequence of flashes of red light.

In the schematic top view of FIG. 7, the beacon light output 54 is illustrated as an illumination cone, leaving the aircraft beacon light 8 laterally outwards in the aircraft frame of reference. In other words, the aircraft beacon light 8 emits a beacon light output 54 laterally outwards. FIG. 7 further depicts a projection 56 of the engine 7. The projection 56 is illustrated as a cone, leaving the lower fuselage-mounted beacon light 12 and enveloping the longitudinal extension of the engine 7 in the aircraft frame of reference. In the depicted horizontal drawing plane, the projection 56 is a sector having an opening angle of about 30°.

The beacon light output 54 is a wider cone than the projection 56 of the engine 7. The aircraft beacon light 8 is thus able to fill the entire gap in the beacon light output of the lower fuselage-mounted beacon light 12 that is created due to the light blocking by the engine 7. In the depicted horizontal drawing plane, the beacon light output 54 is a sector having an opening angle of about 45°. As can be seen from the angles between the projection 56 and the beacon light output 54, the beacon light output fills the entire gap at some lateral distance from the foldable wing tip 64. In this way, the beacon light output of the entire beacon light system is perceived as undisturbed by the folded up foldable wing tip 64 at some distance from the aircraft 2.

It is understood that the considerations laid out above with respect to the right wing 6 apply to the left wing 6 in an analogous manner. For ease of illustration, the projection 56 and the beacon light output 54 are depicted for the right wing 6 only.

Figure 8:
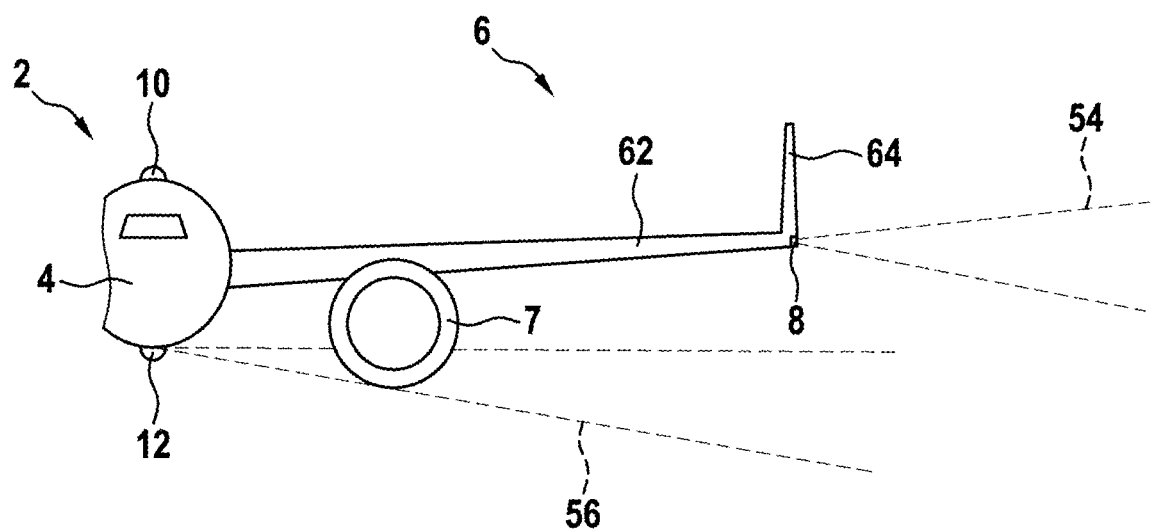
FIG. 8 illustrates a beacon light output, as emitted by an aircraft beacon light in accordance with another exemplary embodiment of the invention, in the context of a schematic front view of an aircraft in accordance with an exemplary embodiment of the invention.

FIG. 8 illustrates a beacon light output 54, as emitted by an aircraft beacon light 8 in accordance with another exemplary embodiment of the invention, in the context of a schematic front view of an aircraft 2 in accordance with an exemplary embodiment of the invention. The aircraft 2 may be the aircraft 2 of FIGS. 1 and 7. Like elements are denoted with like reference numerals, and reference is made to the description thereof above. In FIG. 8, only the left wing 6 is shown. It is understood that the aircraft 2 has a substantially mirror-symmetric right wing.

In the schematic front view of FIG. 8, the beacon light output 54 is illustrated as an illumination cone, leaving the aircraft beacon light 8 laterally outwards in the aircraft frame of reference, i.e. to the right in the drawing plane of FIG. 8. As is apparent from looking at FIGS. 7 and 8, the beacon light output 54 is a three-dimensional illumination cone, having both a horizontal opening angle and a vertical opening angle. FIG. 8 further depicts the projection 56 of the engine 7, as seen from the front of the aircraft 2. The projection 56 is illustrated as a cone, leaving the lower fuselage-mounted beacon light 12. The upper line of the projection 56 corresponds to the highest light emission direction of the lower fuselage-mounted beacon light 12. The lower line of the projection 56 runs along the lower end of the engine 7. The projection 56 corresponds to the shadow created by the engine 7. In the depicted vertical drawing plane, the projection 56 is a sector having an opening angle of about 10°.

The beacon light output 54 is a wider cone than the projection 56 of the engine 7. The aircraft beacon light 8 is thus able to fill the entire gap in the beacon light output of the lower fuselage-mounted beacon light 12 that is created due to the light blocking by the engine 7. In the depicted vertical drawing plane, the beacon light output 54 is a sector having an opening angle of about 20°. As can be seen from the angles between the projection 56 and the beacon light output 54, the beacon light output fills the entire gap at some lateral distance from the aircraft 2. In this way, the beacon light output of the entire beacon light system is perceived as undisturbed by the engine 7 at some distance from the aircraft 2.

Figure 9:
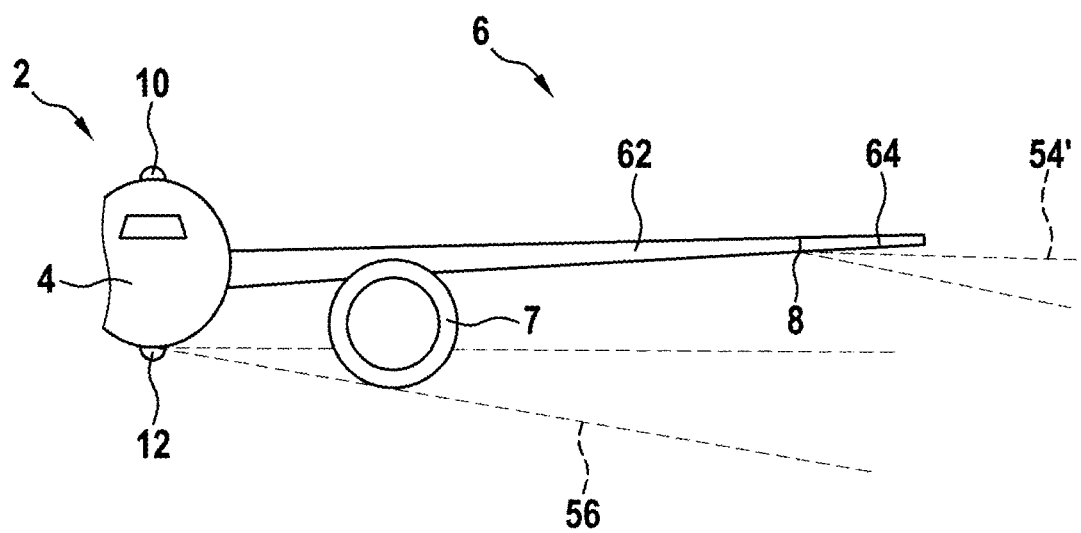
FIG. 9 illustrates the change in the beacon light output, as illustrated in FIG. 8, for the foldable wing tip being in a laterally extended position.

FIG. 9 illustrates the change in the beacon light output 54, as illustrated in FIG. 8, for the foldable wing tip 64 being in a laterally extended position. The modified beacon light output is referred to as beacon light output 54'. As stated above, the aircraft beacon light 8 of FIGS. 7 to 9 emits part of its beacon light output 54 through the part of the lens cover on the side face of the main wing portion 62 and part of its beacon light output 54 through the part of the lens cover on the underside of the main wing portion 62. When the foldable wing tip 64 is in the laterally extended position, as illustrated in FIG. 9, it blocks that part of the beacon light output 54 that is emitted through the part of the lens cover on the side face of the main wing portion 62. Some or all of the part of the beacon light output 54 that is emitted through the part of the lens cover on the underside of the main wing portion 62 is still emitted into the aircraft environment. This is illustrated via the modified beacon light output 54' in FIG. 9. In this way, the gap in the beacon light output of the lower fuselage-mounted beacon light 12, created due to the light blocking by the engine 7, may be partly or entirely filled by the modified beacon light output 54', although the foldable wing tip 64 blocks part of the beacon light output 54.

An aircraft beacon light according to exemplary embodiments of the invention may have a beacon light output 50, as illustrated with respect to FIGS. 5 and 6, or may have a beacon light output 54, as illustrated with respect to FIGS. 7 to 9. It is also possible that an aircraft beacon light has both the beacon light output 50, as illustrated with respect to FIGS. 5 and 6, and the beacon light output 54, as illustrated with respect to FIGS. 7 to 9. In the latter case, the aircraft beacon light may have dedicated light sources and optical systems for the beacon light output 50 on the one hand and for the beacon light output 54 on the other hand. For example, the aircraft beacon light may have at least one first light source and a first optical system for generating the beacon light output 50 and may have at least one second light source and a second optical system for generating the beacon light output 54. It is also possible that the aircraft beacon light has an extended beacon light output that fills both the gaps in the beacon light outputs from the fuselage-mounted beacon lights due to the engine and the folded up foldable wing tip. The horizontal opening angle of such an extended beacon light output could be about 90° for filling both gaps. It is also possible that separate aircraft beacon lights, each targeted to one of the shadow of the foldable wing tip 64 and the shadow of the engine 7, are provided in the hinge assembly of the aircraft wing 6.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Aircraft beacon light for an aircraft wing with a foldable wing tip, the aircraft beacon light comprising:
   a housing,
   a lens cover, and
   at least one light source arranged between the housing and the lens cover,
   wherein the aircraft beacon light is configured to emit flashes of red light in operation, and
   wherein the housing and the lens cover are shaped to embed the aircraft beacon light into a hinge assembly coupling the foldable wing tip to a main wing portion of the aircraft wing;
   wherein the housing and the lens cover are shaped to embed the aircraft beacon light into a lateral end of the main wing portion of the aircraft wing,
   wherein the lens cover has a substantially flat first lens cover portion configured to form part of a side face of the main wing portion of the aircraft wing, when the foldable wing tip is in a folded up position, and
   wherein the lens cover further comprises a second lens cover portion configured to form part of an underside of the main wing portion, when the aircraft beacon light is connected to the lateral end of the main wing portion, with the second lens cover portion forming part of the underside of the main wing portion both when the foldable wing tip is in the folded up position and when the foldable wing tip is in a laterally extended position.

2. Aircraft beacon light according to claim 1, wherein the at least one light source is at least one red light source, in particular at least one red LED.

3. Aircraft beacon light according to claim 1, wherein the lens cover is or comprises a red light filter.

4. Aircraft wing, comprising:
   a main wing portion,
   a foldable wing tip,
   a hinge assembly coupling the main wing portion and the foldable wing tip, and
   an aircraft beacon light according to any of the preceding claims, embedded into the hinge assembly such that the substantially flat first lens cover portion forms part of the side face of the main wing portion when the foldable wing tip is in the folded up position, and that the second lens cover portion forms part of the underside of the main wing portion, both when the foldable wing tip is in the folded up position and when the foldable wing tip is in the laterally extended position.

5. Aircraft wing according to claim 4, wherein the hinge assembly is configured to allow for a motion of the foldable wing tip between a laterally extended position and a folded up position and wherein the foldable wing tip exposes at least part of the lens cover of the aircraft beacon light, when in the folded up position.

6. Aircraft wing according to claim 4, wherein the hinge assembly comprises a plurality of first teeth, which are an integral part of the main wing portion, and a plurality of second teeth, which are an integral part of the foldable wing tip, and wherein the aircraft beacon light is arranged in one of the plurality of first teeth;
   wherein the plurality of first teeth and the plurality of second teeth are engaged with each other via a rotation axis of the foldable wing tip.

7. Aircraft wing according to any of claim 4, wherein the aircraft beacon light is configured to emit the flashes of red light over a horizontal opening angle of between 5° and 30°, in particular over a horizontal opening angle of between 5° and 20°, further in particular over a horizontal opening angle of between 5° and 15°.

8. Aircraft wing according any of claim 7, wherein the aircraft beacon light is configured to emit the flashes of red light over a vertical opening angle of between 5° and 180°, in particular over a vertical opening angle of between 5° and 150°, further in particular over a vertical opening angle of between 5° and 30°.

9. Aircraft wing according to any of claim 8, wherein the aircraft beacon light is configured to emit the flashes of red light over a solid angle containing a projection of the foldable wing tip, when in the folded up position, as projected from the position of an upper fuselage-mounted beacon light.

10. The aircraft wing according to claim 4, wherein the aircraft beacon light is configured to emit the flashes of red light over a vertical opening angle of between 5° and 180°.

11. The aircraft wing according to claim 4, wherein the aircraft beacon light is configured to emit the flashes of red light over a vertical opening angle of between 5° and 150°.

12. The aircraft wing according to claim 4, wherein the aircraft beacon light is configured to emit the flashes of red light over a vertical opening angle of between, further in particular over a vertical opening angle of between 5° and 30°.

13. The aircraft wing according to claim 4, wherein the aircraft beacon light is configured to emit the flashes of red light over a solid angle containing a projection of the foldable wing tip, when in the folded up position, as projected from the position of an upper fuselage-mounted beacon light.

14. An aircraft beacon light system, comprising:
    an upper fuselage-mounted beacon light configured to emit flashes of red light in operation,
    a lower fuselage-mounted beacon light configured to emit flashes of red light in operation,
    a right wing aircraft beacon light that is an aircraft beacon light according to claim 1, and
    a left wing aircraft beacon light that is an aircraft beacon light according to claim 1.

15. The aircraft beacon light system according to claim 14, wherein the upper fuselage-mounted beacon light, the lower fuselage-mounted beacon light, the right wing aircraft beacon light and the left wing aircraft beacon light are synchronized with respect to emitting the flashes of red light.

16. A method of supplementing an aircraft beacon light system having an upper fuselage-mounted beacon light and a lower fuselage-mounted beacon light, the method comprising:
    emitting flashes of red light from a hinge assembly of the aircraft wing according to claim 6 through the substantially flat first lens cover portion of the lens cover, when the foldable wing tip of the aircraft wing is in the folded up position; and
    emitting flashes of red light through the second lens cover portion of the lens cover both when the foldable wing tip is in the folded up position and when the foldable wing tip is in the laterally extended position.

17. The method according to claim 16, wherein said emitting the flashes of red light comprises emitting flashes of red light over a solid angle containing a projection of the foldable wing tip, when in the folded up position, as projected from the position of the upper fuselage-mounted beacon light.

* * * * *